(12) United States Patent
Mizuhashi et al.

(10) Patent No.: US 9,856,946 B2
(45) Date of Patent: Jan. 2, 2018

(54) GEAR TRANSMISSION

(71) Applicant: NABTESCO CORPORATION, Tokyo (JP)

(72) Inventors: Hiroki Mizuhashi, Tsu (JP); Kazuma Oishi, Tsu (JP); Takahito Azuma, Tsu (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 14/910,837

(22) PCT Filed: Jul. 30, 2014

(86) PCT No.: PCT/JP2014/070107
§ 371 (c)(1),
(2) Date: Feb. 8, 2016

(87) PCT Pub. No.: WO2015/019924
PCT Pub. Date: Feb. 12, 2015

(65) Prior Publication Data
US 2016/0186836 A1 Jun. 30, 2016

(30) Foreign Application Priority Data
Aug. 9, 2013 (JP) ................................. 2013-166927

(51) Int. Cl.
*F16H 1/32* (2006.01)
*H02K 7/116* (2006.01)
(52) U.S. Cl.
CPC ............... *F16H 1/32* (2013.01); *H02K 7/116* (2013.01); *F16H 2001/323* (2013.01)

(58) Field of Classification Search
CPC ........ F16H 2001/323; F16H 1/32–1/36; B60K 6/365; B60K 6/50; H02K 7/116
See application file for complete search history.

(56) References Cited

U.S. PATENT DOCUMENTS

2011/0207576 A1 8/2011 Wang
2016/0061292 A1* 3/2016 Mizuhashi ................ F16H 1/32
475/162

FOREIGN PATENT DOCUMENTS

| CN | 101878583 A | 11/2010 |
|---|---|---|
| CN | 102187121 A | 9/2011 |
| EP | 2 169 263 A1 | 3/2010 |
| EP | 2 234 249 A1 | 9/2010 |
| JP | H08-226498 A | 9/1996 |

(Continued)

OTHER PUBLICATIONS

International Search Report as issued in International Patent Application No. PCT/JP2014/070107, dated Oct. 14, 2014.

(Continued)

*Primary Examiner* — Huan Le
(74) *Attorney, Agent, or Firm* — Pillsbury Winthrop Shaw Pittman, LLP

(57) ABSTRACT

A gear transmission is provided with a gear structure and a plurality of motors. The gear structure is provided with a plurality of crank shafts, an eccentric rotation gear, and a rotation gear. Each motor is attached to one of the crank shafts. At least one of the plurality of motors is a first motor, and at least another of the plurality of motors is a second motor. The second motor has a length in an axial direction shorter than that of the first motor.

9 Claims, 3 Drawing Sheets

(56) References Cited

FOREIGN PATENT DOCUMENTS

| | | |
|---|---|---|
| JP | 2011-147223 A | 7/2011 |
| JP | 2013-118814 A | 6/2013 |
| WO | WO 2008/149696 A1 | 12/2008 |

OTHER PUBLICATIONS

Written Opinion of the International Searching Authority as issued in International Patent Application No. PCT/JP2014/070107, dated Oct. 14, 2014.
Extended European Search Report as issued in European Patent Application No. 14834803.0, dated Mar. 30, 2017.
Office Action Chinese Patent Application No. 201480043388.1 dated Sep. 15, 2017 with partial English translation.

* cited by examiner

GEAR TRANSMISSION

CROSS-REFERENCE TO RELATED APPLICATIONS

This application is the U.S. National Stage of PCT/JP2014/070107, filed on Jul. 30, 2014, which claims priority to Japanese Patent Application No, 2013-166927, filed on Aug. 9, 2013. The contents of these applications are incorporated herein by reference in their entireties. The present specification discloses a technique relating to a gear transmission. In particular, the present specification relates to a gear transmission provided with a plurality of crankshafts.

TECHNICAL FIELD

Background Art

A gear transmission using an eccentric rotation gear is known. The eccentric rotation gear rotates eccentrically relative to an output shaft of the gear transmission. In such a gear transmission, a plurality of crank shafts may in some cases be engaged with the eccentric rotation gear. Japanese Patent Application Publication No. 2011-147223 discloses a gear transmission that attaches a motor to all of crank shafts. Hereinbelow, Japanese Patent Application Publication No. 2011-147223 will be referred to as Patent Document 1. Further, the gear transmission of the Patent Document 1 has an encoder attached to one of the plurality of crank shafts.

SUMMARY OF INVENTION

In the technique of Patent Document 1, a generation of a backlash between an external gear and the crank shafts can be prevented by driving all of the crank shafts by the motors. Specifically, a generation of a phase difference among the crank shafts can be prevented. However, since the motors are attached to all of the crank shafts, it is inevitable to lengthen a length of the gear transmission in an axial direction due to the attachment of the encoder to a crank shaft. The present disclosure provides a technique that enables size reduction of a gear transmission while preventing a generation of a phase difference among the crank shafts in the gear transmission provided with a plurality of crank shafts.

The gear transmission disclosed in the present disclosure comprises a gear structure and a plurality of motors configured to drive the gear structure. The gear structure comprises a plurality of crankshafts, an eccentric rotation gear, and a rotation gear configured to rotate relative to the eccentric rotation gear. Each of the crankshafts comprises an eccentric body. The plurality of motors is respectively attached to the plurality of crankshafts. The eccentric rotation gear engages with the eccentric bodies provided on the crank shafts. The rotation gear comprises a different number of teeth from that of the eccentric rotation gear, and meshes with the eccentric rotation gear. In the gear transmission disclosed in the present disclosure, at least one of the plurality of motors is a first motor, and at least one of the plurality of motors is a second motor. A length of the second motor in an axial direction is shorter than that of the first motor.

According to the above gear transmission, since the motors are connected to all of the crank shafts, a generation of a phase difference among the crank shafts can be prevented. Further, since the length of the second motor in the axial direction is shorter than the length of the first motor, a sum of the lengths of the second motor and the crank shaft becomes shorter than a sum of the lengths of the first motor and the crank shaft. By attaching an encoder and the like to the crank shaft to which the second motor has been attached, a length of the gear transmission in the axial direction can be shortened than in a case of attaching the encoder and the like to the crank shaft to which the first motor has been attached.

Notably, the technique disclosed in the present disclosure does not merely use motors with a short length in the axial direction. A motor with such a short length in the axial direction typically has smaller output torque. Due to this, if the length of all of the motors in the axial direction are made short, the output torque of the gear transmission is reduced. The technique disclosed in the present disclosure uses plural types of motors (at least the first motor and the second motor) with different lengths in the axial direction in a single gear transmission. According to this, the reduction in the output torque of the gear transmission is suppressed while enabling size reduction of the gear transmission.

DESCRIPTION OF EMBODIMENTS

Hereinbelow, some of technical features of embodiments disclosed in the present disclosure will be described. Notably, matters described hereinbelow have technical usefulness solely on their own.

One of a plurality of motors may be a second motor (which is a motor having a shorter length in an axial direction than the first motor) and another of the plurality of motors may be a first motor. Typically, the first motor has larger output torque than the second motor. By keeping a number of the second motors to minimum, output torque of a gear transmission can be made larger compared to a gear transmission that is provided with plural second motors.

All of a plurality of motors may be electrically connected in series with each other. By serially connecting all of the motors, all of the motors stop when a wiring (coil) of one of the motors is broken. A situation in which the gear transmission keeps running while being in a state having its input torque (output torque of the motors) being decreased due to a wiring breakage in one of the motors can be prevented. Notably, in a case where the motors are multi-phase motors, "motors being electrically connected in series with each other" means that wirings of each phase are connected in series. For example, in a case of serially connecting three motors of three phases, namely of U phase, V phase, and W phase, wirings of the U phase are serially connected by three motors, wirings of the V phase are serially connected by three motors, and wirings of the W phase are serially connected by three motors. In this case, the U phase, V phase, and W phase are not connected at the first and second motors, but the U phase, V phase, and W phase are connected at the third motors.

Embodiment

In an embodiment, a gear transmission will be described in which a plurality of crank shafts is engaged with an external gear, and the external gear rotates eccentrically. In the gear transmission of the embodiment, an internal gear rotates relative to the external gear while meshing with the external gear. The technique disclosed in the present disclosure can be adapted to a gear transmission in which a plurality of crank shafts is engaged with the internal gear, and the internal gear rotates eccentrically. In this case, the external gear meshes with the internal gear that rotates eccentrically, and the external gear rotates relative to the internal gear. Further, in the embodiment, an example in which three crank shafts are engaged with the external gear will be described. However, a number of the crank shafts may be two, or four or more.

Figure 1:
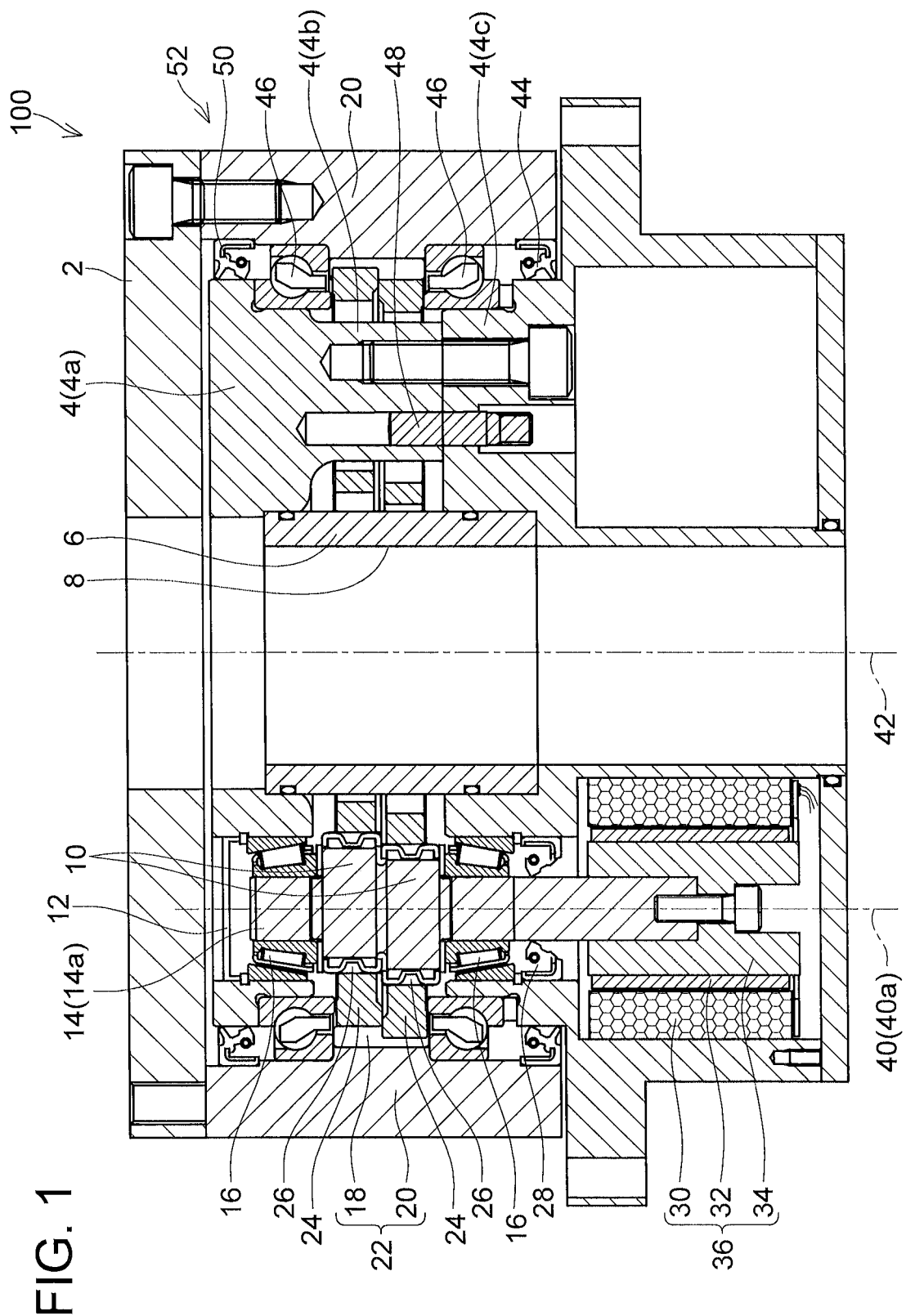
FIG. 1 is a cross sectional view of a gear transmission of an embodiment.
Figure 2:
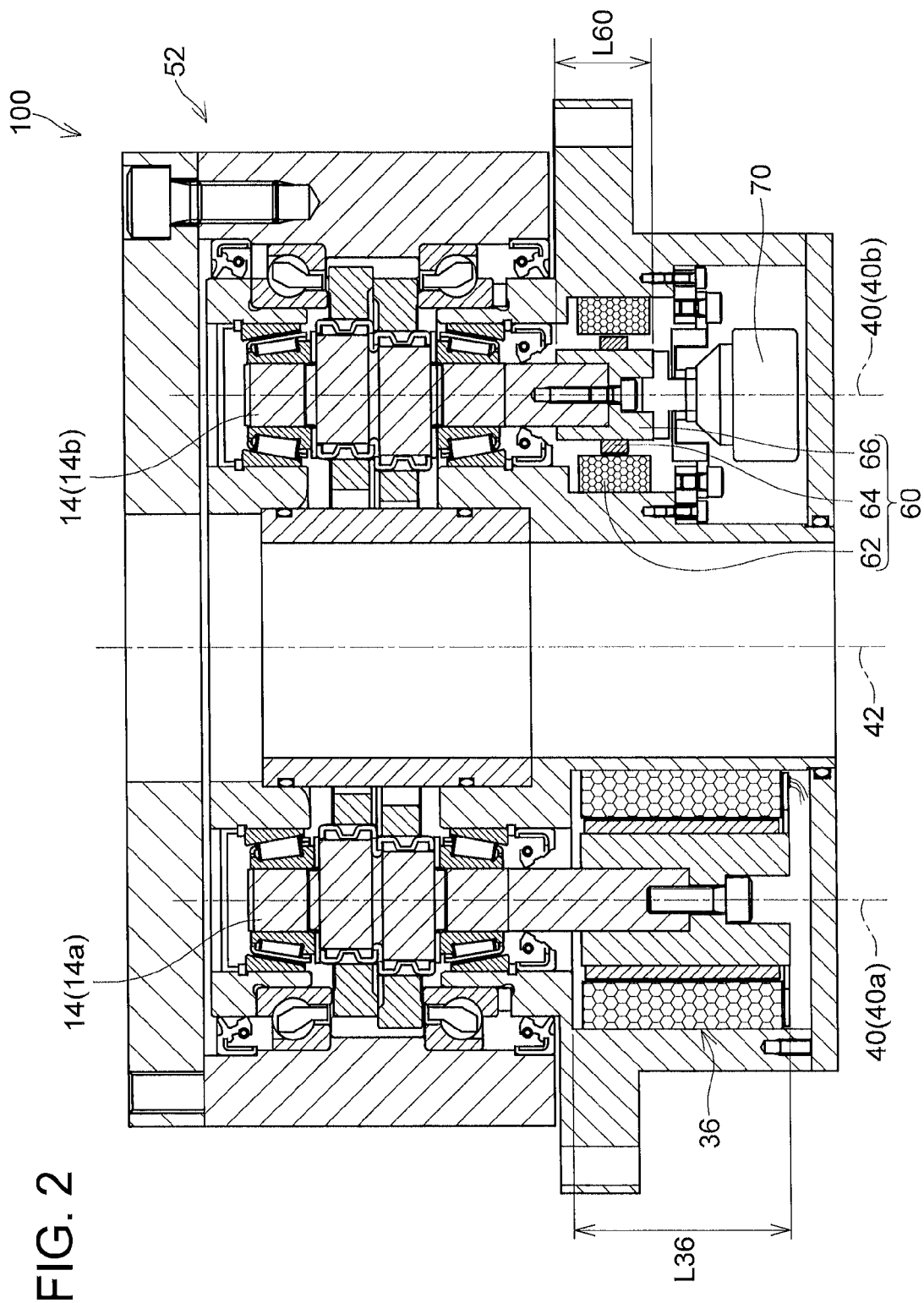
FIG. 2 is a cross sectional view of the gear transmission of the embodiment from a different angle.

A gear transmission 100 will be described. The gear transmission 100 comprises three crank shafts 14a, 14b, and 14c. FIG. 1 shows location where a cross section of the crank shaft 14a is shown, but cross sections of the crank shafts 14b and 14c are not shown. FIG. 2 shows location where the cross sections of the crank shafts 14a and 14b are shown, but the cross section of the crank shaft 14c is not shown. Notably, in FIG. 2, for clarification of the drawing, some of reference signs used in FIG. 1 are omitted. Axial lines 40a, 40b, and 40c of the crank shafts 14a, 14b, and 14c extend parallel to an axial line 42 at positions that are offset from the axial line 42 of the gear transmission 100.

Figure 3:
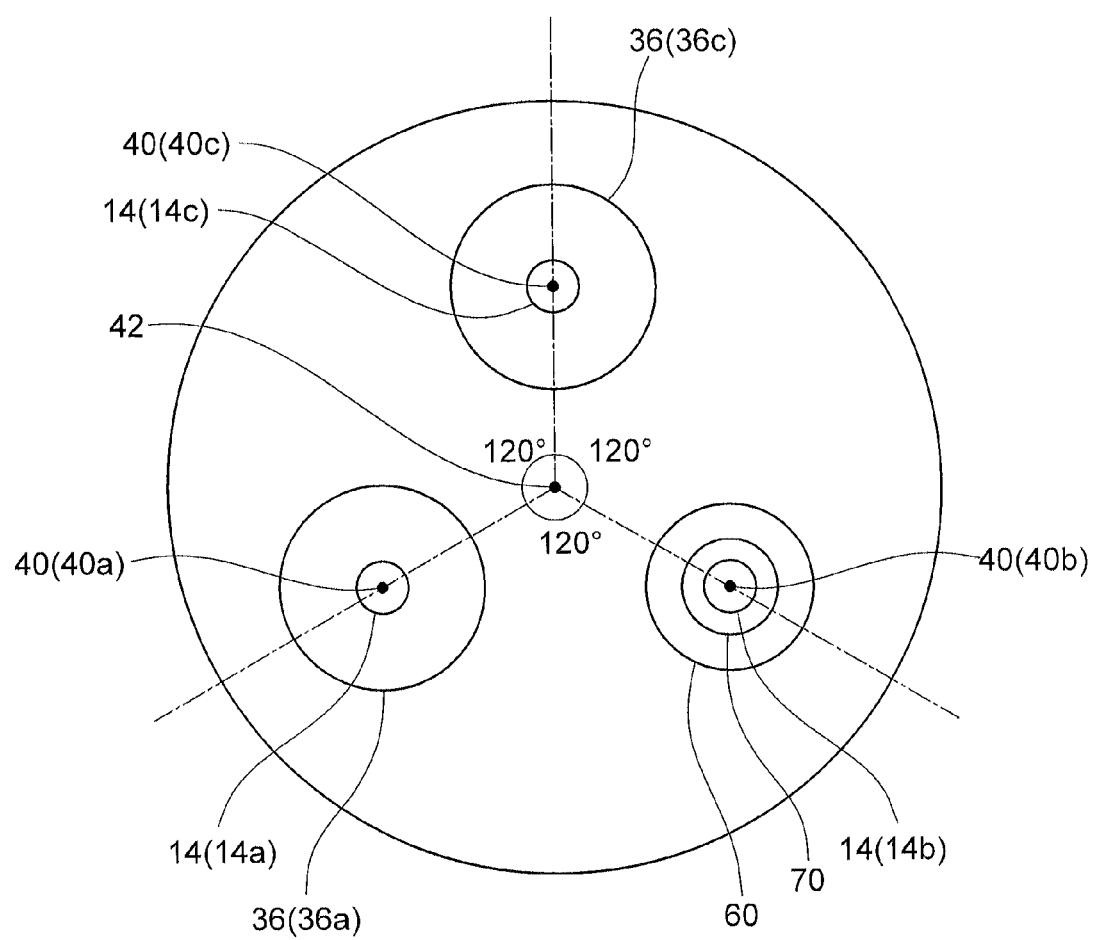
FIG. 3 is a diagram explaining an arrangement state of crank shafts and motors.

As shown in FIG. 3, the crank shafts 14a, 14b, and 14c are arranged at regular intervals around the axial line 42. That is, an angle formed by connecting axial line 40a-axial line 42-axial line 40b, an angle formed by connecting axial line 40b-axial line 42-axial line 40c, and an angle formed by connecting axial line 40c-axial line 42-axial line 40a are respectively 120 degrees. A motor 36a is attached to the crank shaft 14a, a motor 60 is attached to the crank shaft 14b, and a motor 36c is attached to the crank shaft 14c. The motors 36a, 36c are examples of a first motor, and the motor 60 is an example of a second motor. Notably, the motors 36a, 36c have an identical structure.

The crank shaft 14b has an encoder 70 attached thereto. Notably, the encoder 70 is not attached to the crank shafts 14a and 14c. In the description below, the motors 36a, 36c may simply be termed motors 36. Further, the crank shafts 14a, 14b, and 14c may simply be termed crank shafts 14.

As shown in FIG. 1 and FIG. 2, the gear transmission 100 comprises a gear structure 52 and a plurality of motors (first motors 36a, 36c and second motor 60). The gear structure 52 comprises the crank shafts 14, two external gears 24, and an internal gear 22. The first motor 36 is attached to the crank shaft 14a, the second motor 60 is attached to the crank shaft 14b, and the first motor 36 is attached to the crank shaft 14c (see FIG. 3). The external gear 24 is an example of an eccentric rotation gear, and the internal gear 22 is an example of a rotation gear.

By referring to FIG. 1, a specific structure of the gear transmission 100 will be described. The crank shafts 14 are each provided with two eccentric bodies 10. The two eccentric bodies 10 are offset in opposite directions of one another relative to the axial line 40 of the crank shaft 14. Each external gear 24 is engaged with the corresponding eccentric body 10 via a cylindrical roller bearing 26. Due to this, when the crank shafts 14 rotate, the eccentric bodies 10 rotate eccentrically about the corresponding axial line 40, as a result of which the external gears 24 rotate about the axial line 42 eccentrically while being meshed with the internal gear 22.

Each of the crank shafts 14 is supported rotatably by a pair of bearings 16 on a carrier 4. In the gear structure 52, conical roller bearings are used as the pairs of bearings 16. The crank shafts 14 are restricted to move in an axial direction and a radial direction relative to the carrier 4 by the pairs of bearings 16. Further, the carrier 4 is supported on a casing 20 by a pair of bearings 46. In the gear structure 52, angular ball bearings are used as the pair of bearings 46. The carrier 4 is restricted to move in an axial direction and a radial direction relative to the casing 20 by the pair of bearings 46.

A plurality of inner teeth pins 18 is arranged on an inner circumferential surface of the casing 20, Each of the inner teeth pins 18 is arranged at regular intervals around the axial line 42. The internal gear 22 is configured by the casing 20 and the inner teeth pins 18. The internal gear 22 is meshed with the external gears 24. A number of teeth of the internal gear 22 (number of the inner teeth pins 18) differs from a number of teeth of the external gears 24. In the gear structure 52, the number of teeth of the internal gear 22 is greater than the number of teeth of the external gears 24 by one.

The external gears 24 rotate eccentrically while meshing with the internal gear 22. When the external gears 24 rotate eccentrically, the external gears 24 rotate relative to the internal gear 22 according to the difference in the teeth number between the external gears 24 and the internal gear 22. The carrier 4 supports the external gears 24 via the crank shafts 14, and the casing 20 configures a part of the internal gear 22, Due to this, when the external gears 24 rotate relative to the internal gear 22, the carrier 4 rotates relative to the casing 20. In the gear structure 52, the carrier 4 is fixed to a base (not shown), and a rotated member 2 is fixed to the casing 20. Due to this, when the external gears 24 rotate eccentrically (the crank shafts 14 rotate), the rotated member 2 rotates relative to the base. Notably, the axial line 42 can be said as being a rotation axis of the casing 20 (internal gear 22).

The carrier 4 comprises a first member 4a and a second member 4c. The first member 4a comprises columnar parts 4b. The columnar parts 4b extend from the first member 4a toward the second member 4c, and pass through corresponding through holes provided in the external gears 24. The columnar parts 4b are fixed to the second member 4c by bolts. The first member 4a and the second member 4c are positioned by tapered pins.

A through hole extending along the axial line 42 is provided at a center of the carrier 4 (first member 4a and second member 4c). A cylinder body 6 is arranged within the through hole of the carrier 4. One end of the cylinder body 6 is fixed to the first member 4a, and the other end is fixed to the second member 4c. A through hole 8 provided in the cylinder body 6 communicates with the through hole of the carrier 4. That is, a through hole extending along the axial line 42 is provided at a center of the gear transmission 100.

The motors 36, 60 are fixed to the second member 4c (see FIG. 2 also). Each first motor 36 comprises a rotor 34 and a stator 30. The rotor 34 is fixed to the corresponding crank shaft 14. Permanent magnets 32 are attached to a surface of the rotor 34. The stator 30 is fixed to the second member 4c of the carrier 4. The stator 30 comprises a coil, and current from a power source (not shown) flows in the coil. The second motor 60 comprises a rotor 66 and a stator 62. The rotor 66 is fixed to the corresponding crank shaft 14. Permanent magnets 64 are attached to a surface of the rotor 66. The stator 62 is fixed to the second member 4c of the carrier 4. The stator 62 comprises a coil, and the current from the power source (not shown) flows in the coil.

In the gear transmission 100, the first motors 36 and the second motor 60 are connected in series. Specifically, the coils of the first motors 36 and the coil of the second motor 60 are connected. Due to this, the current supplied from one power source flows through both the first motors 36 and the second motor 60.

As shown in FIG. 2 and FIG. 3, among the three crank shafts 14 (14a, 14b, and 14c), the second motor 60 is attached only to the crank shaft 14b. The first motors 36 are attached to the other crank shafts 14 (14a and 14c). Further, the encoder 70 is attached to the crank shaft 14b, and no encoder 70 is attached to the crank shafts 14a and 14c.

As shown in FIG. 2, a length L60 of the second motor 60 is shorter than a length L36 of the first motors 36 in an axial line 42 direction. Due to this, by attaching the encoder 70 to the crank shaft 14b, a length of the gear transmission 100 in the axial line 42 direction can be made shorter than in a case of attaching the encoder 70 to the crank shaft 14a (or crank shaft 14c). That is, by selectively attaching the encoder 70 to the crank shaft 14b to which the second motor 60 is to be attached, the length of the gear transmission 100 in the axial line 42 direction can be prevented from becoming long.

Advantages of the gear transmission 100 will be described. As described above, in the gear transmission 100, two types of motors with different lengths in the axial direction (first motors 36 and second motor 60) are prepared, and the encoder 70 is attached to the crank shaft (crank shaft 14b) to which the motor with the shorter length in the axial direction (second motor 60) is to be attached. As a result of this, a compact gear transmission can be realized. Further, in the gear transmission 100, the motors (first motors 36 and second motor 60) are attached to all of the crank shafts 14. Due to this, a generation of a backlash between the crank shafts 14 and the external gears 24 while the gear transmission 100 is being driven can be prevented. In other words, the phases of all of the crank shafts 14 can be matched.

In the gear transmission 100, two first motors 36 and one second motor 60 are used. As described above, the length L36 of the first motors 36 in the axial direction is longer than the length L60 of the second motor 60 in the axial direction. That is, the first motors 36 have a larger size than the second motor 60. Typically, a large-sized motor has larger output torque. In the gear transmission 100, a greater number of the motors with the large output torque (first motors 36) are used than the motor with the small output torque (second motor 60). More specifically, in the gear transmission 100, the number of the motor with the small output torque (second motor 60) is minimized (one). Due to this, a gear transmission that is compact and at the same time has large output torque can be realized.

In the gear transmission 100, the first motors 36 and the second motor 60 are connected in series to one power source. Due to this, a generation of a phase difference among the motors 36, 60 can be prevented. Further, the gear transmission 100 can drive a plurality of motors with one single controller. Notably, since the phases of all of the crank shafts 14 are matched, rotation angles of all of the crank shafts 14 can be detected by simply attaching the encoder 70 to one crank shaft 14 (crank shaft 14b).

Oil seals 44, 50 are arranged between the casing 20 and the carrier 40 on outsides of the pair of bearings 46 in the axial line 42 direction. The oil seal 44 is arranged between the casing 20 and the first member 4a, and the oil seal 50 is arranged between the casing 20 and the second member 4c. Further, oil seals 28 and cap 12 are arranged between the crank shafts 14 and the carrier on the outsides of the pair of bearings 46 in an axial line 40 direction. The oil seals 28 are arranged between the crank shafts 14 and the second member 4c, and the caps 12 are attached to holes provided in the first member 4a (holes for arranging the bearings 16 for supporting the crank shafts 14). Lubricant within the gear transmission 100 is prevented from leaking out from the gear transmission 100 by the oil seals 44, 50, 28, and the caps 12. Notably, O-rings are provided between the first member 4a and the cylinder body 6 and between the second member 4c and the cylinder body 6, so the lubricant within the gear transmission 100 is prevented from leaking into the through hole at the center of the gear transmission 100.

In the above embodiment, the gear transmission 100 having three crank shafts 14 and three motors (first motors 36 and second motor 60) has been described. The numbers of the crank shafts and motors are not limited to the above embodiment. The technique disclosed in the present disclosure can be adapted to any type of gear transmission in which a plurality of crank shafts is provided, and a motor is attached to the respective crank shafts. Importance lies in that a motor with a shorter length in the axial direction than other motors is used as at least one of the motors among the plurality of motors.

In the above embodiment, an example in which an encoder is attached to a crank shaft to which the motor with the short length in the axial direction (second motor) is attached has been described. However, another component (for example, a brake) may be disposed in a space generated by using the second motor. Further, in addition to the first motor and the second motor, a third motor having a length in the axial direction that is different from both the first motor and the second motor may be used. For example, a third motor having a length in the axial direction that is shorter than the first motor but longer than the second motor may be used. In this case, a component other than the encoder may be attached to the crank shaft to which the third motor has been attached.

In the above embodiment, both the first motor and the second motor are radial gap motors. However, axial gap motors may be used as the first motor and the second motor. Alternatively, the first motor may be a radial gap motor, and the second motor may be an axial gap motor. It is easier to shorten the length of the axial gap motor in the axial direction than the radial gap motor. The length of the gear transmission in the axial direction becoming long can further be prevented.

Specific examples of the present invention have been described in detail, however, these are mere exemplary indications and thus do not limit the scope of the claims. The art described in the claims includes modifications and variations of the specific examples presented above. Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

The invention claimed is:
1. A gear transmission comprising:
a gear structure; and
a plurality of motors configured to drive the gear structure,
wherein the gear structure comprises:
a plurality of crankshafts, each of the plurality of motors being attached to one of the plurality of crankshafts, and each of the crankshafts comprising an eccentric body;
an eccentric rotation gear engaging with the eccentric bodies; and a rotation gear comprising a different number of teeth from that of the eccentric rotation gear and meshing with the eccentric rotation gear, the rotation gear being configured to rotate relative to the eccentric rotation gear, wherein at least one of the plurality of motors is a first motor, at least another of the plurality of motors is a second motor, and a length of the second motor in an axial direction is shorter than that of the first motor.

2. The gear transmission according to claim 1, wherein the plurality of motors further includes an additional said first motor, and wherein the length, in the axial direction, of the second motor is shorter than lengths of the first motor and the additional said first motor.

3. The gear transmission according to claim 2, wherein an encoder is attached to the second motor.

4. The gear transmission according to claim 3, wherein all of the plurality of motors are electrically connected in series with each other.

5. The gear transmission according to claim 1, wherein all of the plurality of motors are electrically connected in series with each other.

6. A gear transmission comprising:
a first motor;
a second motor having a length in an axial direction shorter than that of the first motor;
a first crankshaft attached to the first motor, the first crankshaft comprising a first eccentric body;
a second crankshaft attached to the second motor, the second crankshaft comprising a second eccentric body;
an eccentric rotation gear engaging with the first and second eccentric bodies; and
a rotation gear comprising a different number of teeth from that of the eccentric rotation gear and meshing with the eccentric rotation gear, the rotation gear being configured to rotate relative to the eccentric rotation gear.

7. The gear transmission according to claim 1, wherein the plurality of motors includes two motors, wherein one of the plurality of motors is the second motor and the other of the plurality of motors is the first motor.

8. The gear transmission according to claim 7, wherein an encoder is attached to the second motor.

9. The gear transmission according to claim 8, wherein the first motor and the second motor are electrically connected in series.

* * * * *